(12) United States Patent
Wirz Luchsinger

(10) Patent No.: US 10,264,778 B2
(45) Date of Patent: Apr. 23, 2019

(54) MANUAL SPRAYER TO PREVENT FLUID LEAKAGE

(71) Applicant: SWISSMEX-RAPID, S.A. de C.V., Lagos de Moreno (MX)

(72) Inventor: Pedro Wirz Luchsinger, Lagos de Moreno (MX)

( * ) Notice: Subject to any disclaimer, the term of this patent is extended or adjusted under 35 U.S.C. 154(b) by 248 days.

(21) Appl. No.: 14/649,117

(22) PCT Filed: Mar. 12, 2013

(86) PCT No.: PCT/IB2013/000945
§ 371 (c)(1),
(2) Date: Jun. 2, 2015

(87) PCT Pub. No.: WO2014/087204
PCT Pub. Date: Jun. 12, 2014

(65) Prior Publication Data
US 2015/0296764 A1 Oct. 22, 2015

(30) Foreign Application Priority Data
Dec. 3, 2012 (MX) ................... MX/a/2012/014050

(51) Int. Cl.
*B05B 9/00* (2006.01)
*A01M 7/00* (2006.01)
*B05B 9/08* (2006.01)

(52) U.S. Cl.
CPC ........ *A01M 7/0046* (2013.01); *A01M 7/0017* (2013.01); *B05B 9/0877* (2013.01)

(58) Field of Classification Search
CPC ............................ B05B 9/0877; B05B 9/0888
(Continued)

(56) References Cited

U.S. PATENT DOCUMENTS

| 4,702,419 A | 10/1987 | Luchsinger |
| 5,335,853 A * | 8/1994 | Wirz ................... B05B 9/0877 |
| | | 222/175 |

(Continued)

FOREIGN PATENT DOCUMENTS

| CA | 1291730 C | 11/1991 |
| MX | 156904 A | 10/1988 |

(Continued)

OTHER PUBLICATIONS

PCT International Search Report dated Nov. 1, 2013 in related PCT Application No. PCT/IB2013/000945.
(Continued)

*Primary Examiner* — Viet Le
(74) *Attorney, Agent, or Firm* — Robert D. Buyan; Stout, Uxa & Buyan, LLP

(57) ABSTRACT

Improvements in an agricultural manual sprayer for preventing leakage of fluids such as insecticides, herbicides or fungicides that comprises tank with a large storage capacity into which a pressure vessel is installed. A manually activated pumping assembly is connected with the inferior section of the pressure vessel and also with the inferior section of the tank. The pumping assembly comprises a reciprocating piston pump for extracting the fluid from the storage tank and pressurizing it within the pressure vessel. The pressurized fluid is applied with a hose and a throttle valve attached to the pressure vessel. The assembly also comprises a double walled piston and barrier against leakage consisting of a ring with interior lips which seal it against the cylinder preventing the exit of fluid, forcing it to remain in the collection chamber until it is emptied with the downward movement of the piston, returning the liquid from the collection chamber to the storage tank through a return hose and internal ducts.

8 Claims, 3 Drawing Sheets

(58) Field of Classification Search
USPC ......... 239/142, 154, 333; 222/175, 424, 529
See application file for complete search history.

(56) References Cited

U.S. PATENT DOCUMENTS

| | | |
|---|---|---|
| 5,636,791 A | 6/1997 | Leer |
| 6,412,707 B1 | 7/2002 | Wirz |
| 7,854,396 B2 | 12/2010 | Wu |

FOREIGN PATENT DOCUMENTS

| | | |
|---|---|---|
| MX | 157783 | 12/1988 |
| MX | 160084 A | 10/1989 |
| MX | 160085 A | 10/1989 |
| MX | 185553 B | 3/1992 |
| MX | 165049 B | 10/1992 |

OTHER PUBLICATIONS

Supplementary European Search Report dated Jul. 25, 2016 in related European Application No. 13861050.6.

\* cited by examiner

MANUAL SPRAYER TO PREVENT FLUID LEAKAGE

RELATED APPLICATION

This patent application is the national stage filing under 35 U.S.C § 371 of PCT International Patent Application No. PCT/IB2013/000945 entitled IMPROVEMENTS IN MANUAL SPRAYER TO PREVENT FLUID LEAKAGE, filed Mar. 12, 2013, which claims priority to Mexican Patent Application No. MX/a/2012/014050 filed Dec. 3, 2012, the entire disclosure of each such application being expressly incorporated herein by reference.

BACKGROUND

The present invention relates to the field of industry that is dedicated to the design and manufacturing of agricultural equipment, and more particularly manual sprayers for applying insecticides, herbicides or fungicides.

Conventionally, the portable manual equipment for pumping fluids, functions based on gear systems, piston or pistons systems, diaphragm systems, or a combination of diaphragm and piston systems, which allow to not only pump fluid from a storage tank to a pressure vessel but also to agitate and mix the fluids at the bottom of the storage tank. Some of these systems were protected by means of Mexican patents numbered 156904, 157782, 157783, 160084, 160085, 165049, and 185553. Nevertheless, problems have been experienced with the leakage of fluid from the bottom of the manual pumping equipment due to scuffing or softening of some parts from the effects of a certain type of aggressive chemicals, with harmful consequences to the operator and/or the environment.

A significant step in solving the said problem was the implementation of a leakage prevention system protected by means of the Mexican patent number 225563. With this new system, the leaked fluid from the piston chamber is deposited into a primary collection chamber from where it is expelled by the reciprocating action of the piston in an upward motion to a second collection chamber. In its downward movement, the fluid is pumped through a return siphon inside the tank.

Currently, this leakage prevention system has been improved with a sealing barrier against leakage that by means of a sealing ring simplifies the return of fluid into the tank through the internal conduits without perforating the tank.

SUMMARY OF THE INVENTION

The present invention provides sprayer devices having pumping apparatus with associated conduit(s) for returning to the tank any fluid that blows by or otherwise leaks from the pumping and apparatus or from adjacent fixtures/components of the device.

In accordance with the present invention, there is provided a sprayer device generally comprising a) a tank configured to be carried by a human operator; b) a fluid outlet opening in the tank; c) a spray nozzle connected to the outlet opening by one or more conduits; d) pumping apparatus operative to pump fluid from the outlet opening, through said at least one conduit and out of the spray nozzle; e) a leakage fluid collection chamber for collecting fluid that leaks from the pump and/or the tank and/or said at least one conduit and e) at least one fluid return conduit connecting the leakage fluid collection chamber to the tank, wherein the pumping apparatus is additionally operative to pump leakage fluid that enters the leakage fluid collection area through said at least one return conduit and back into the tank.

Further details, variations, optional components and aspects of the present invention will be understood by those of skill in the relevant art upon reading of the detailed description and examples set forth below.

DETAILED DESCRIPTION OF THE PREFERRED EMBODIMENT

Figure 1:
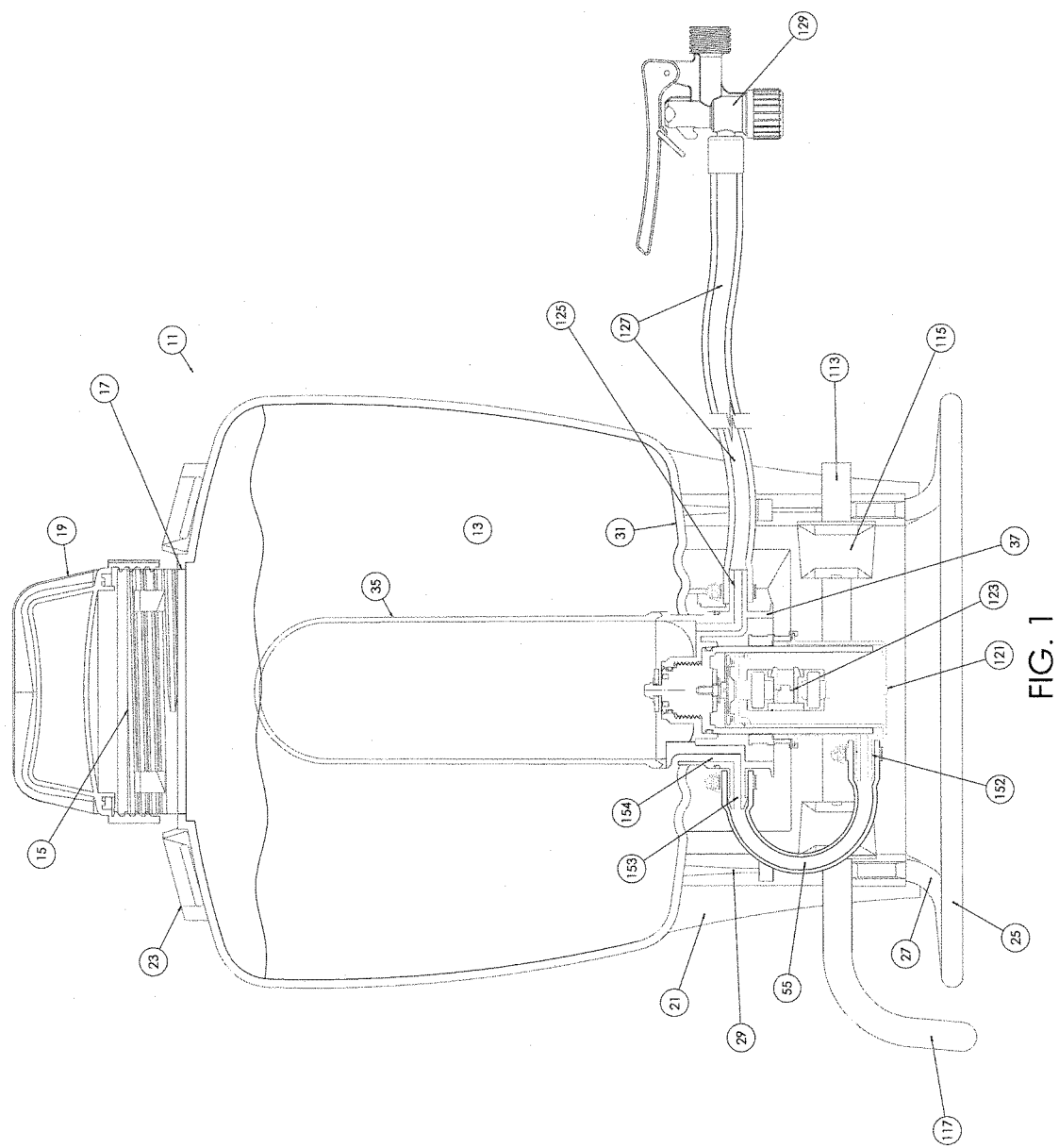
FIG. 1 is a sectional anterior view showing the preferred embodiment of the present invention.

Referring now to the drawings, FIG. 1 illustrates a preferred embodiment of the portable sprayer (11) that includes a fluid storage tank (13)—preferably made from synthetic resin and other lightweight and durable materials—that contains a substantially flat rear side (not shown) adapted to rest against the operator's back who transports and operates the sprayer (11). The storage tank (13) is filled with liquid chemicals such as insecticides, herbicides, and fungicides, etc., through a large fill opening (15) in the neck of the tank (17).

Once the storage tank (13) is filled and ready to be used, a screw cap (19) seals the fill opening (15).

The posterior inferior portion of the storage tank (13) has an integrally molded support structure (21) whose posterior part is firmly connected to the back of the storage tank (13), allowing the whole structure to rest against the operator's back. In the upper posterior portion of the storage tank (13) there are solid openings (23) which support the shoulder straps (not shown) that extend over the shoulders and then extend down to ensure a support frame (25) which is positioned in a generally horizontal plane. The ends of the support frame (25) are bent upwards to form legs (27) which are secured firmly into the vertical studs (29) of the support structure (21).

Figure 2:
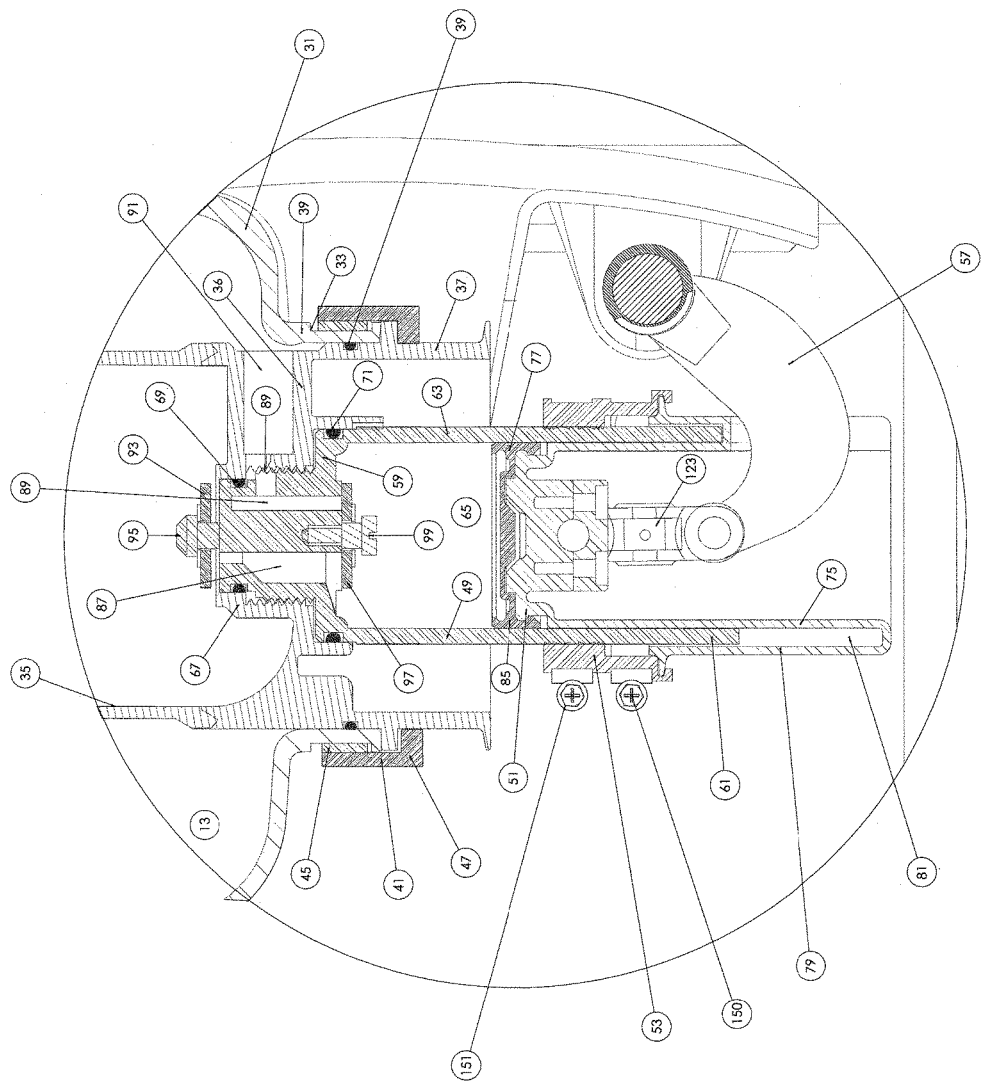
FIG. 2 is a detailed sectional view of a portion of the apparatus in FIG. 1.

In reference to FIG. 2 as well as FIG. 1, the inferior wall (31) of the storage tank (13) is generally horizontal and has a relatively large container opening defined by a cylindrical flange (33) bent downwardly extending from the bottom wall. A pressure vessel (35) vertically elongated is inserted through the container opening extending into the inferior of the storage tank (13). The pressure vessel (35) is constructed from a strong material—preferably a synthetic resin—that is capable of withstanding the pressures created in it by the operation of the pump as described below.

The lower portion of the pressure vessel (35) contains a cylindrical exterior end (37) that fits tightly against the inner cylindrical surface of the flange (33). The cylindrical end (37) includes a first annular groove (39) integrated into the outer surface of the cylindrical end (37) and a radial end flange (41). An o-ring is placed in the first annular groove (39) to provide a seal between the cylindrical end (37) and the flange (33). When the pressure vessel (35) is inserted into the storage tank (13), the radial end flange (41) rests against the flange (33) to prevent the pressure vessel (35) from slipping further into the storage tank (13).

The pressure vessel (35) is firmly held in its place and the seal between the cylindrical end (37) and the flange (33) is reinforced by the application of appropriate mechanical pressure, as well as through the use of the radial end flange with a large diameter (41) installed and tightened around the flange (33) and the pressure vessel (35) at the cylindrical end (37). The terminal lugs spaced circumferentially from the end flange (41) (appearing in FIG. 2) are attached to the clamp (45). The lugs (47) extend around the radial end flange (41) and in combination with the clamp (45) immobilize the pressure vessel (35) in relation to the storage tank (13).

As illustrated in FIG. 2, a pump assembly is positioned at the inferior wall (36) of the pressure vessel (35) within the cylindrical end (37). The pump assembly mainly includes a pump cylinder (49), a reciprocating piston (51), a leakage barrier (53), a return hose (55) (FIG. 1), and a swing piston (57) (FIG. 2).

The pump cylinder (49) is preferably constructed using a synthetic resin material, including an integrated upper end (59) that extends through the inferior wall (36) to the pressure vessel (35) and to a lower open end (61) with a cylinder wall (63) which defines a piston chamber with smooth walls (65). The overall length of the cylinder wall (63) is preferably at least twice the total linear displacement of the piston (51) during operation as written herein. The upper end (59) contains external threads that are threaded together with internal threads of a flange portion (67) that extends internally from the pressure vessel (35). The pressure vessel (35) is sealed against leakage by O-rings positioned in two annular grooves (69 and 71) formed in the upper end (59) of the pump's cylinder (63). The first annular groove (69) is positioned so that it creates a seal between the flange portion (67) and the upper end (59). The second annular groove (71) is positioned so that it creates a seal between the upper end (59) and a cylindrical flange extends from the pressure vessel (35).

The piston (51), preferably constructed using a synthetic resin material comprises an inner wall (75) that has an integral piston head (77) that is soft at one end and at the other end, the inner wall (75) folds on itself to form an outer wall (79). The soft piston head (77) and the inner wall (75) are positioned within the piston chamber (65), and the outer wall (79) is positioned outside of the piston chamber (65), so that the cylinder wall (61) is positioned between the inner and exterior walls (75, 79). The combination of the cylinder wall (61), inner wall (75), and outer wall (79), defines a primary chamber (81) that collects the fluids leaking from the piston. During operation, the piston switches between a first position, illustrated in FIG. 1, wherein the piston head (77) is positioned at the upper end (59) of the piston chamber (65) (the maximum position of upstroke) and a second position, illustrated in FIG. 2 wherein the piston head (77) moves linearly away from the upper end (59) of the piston chamber (65) (the minimum position of the down stroke).

A frustoconically shaped piston cup (77) made from a suitable flexible material and preferably a resilient plug (not porous), is mounted on the head the of piston (51). The piston cup (77) has a sealing surface (85) which is held against the cylinder wall (63) by the resiliency of the cup (77) and the pressure within the piston chamber (65). When the piston (51) moves towards the upper end (59) of the pump's cylinder (49), hereinafter known as the "upstroke", the pressure in the piston chamber (65) increases and the upper sealing surface (85) is pressed further against the wall of the cylinder (63). When the piston (51) moves away from the upper end (59) of the pump's cylinder (49), hereinafter known as the "down stroke" the pressure of the piston chamber decreases (65).

The upper end of the piston (59) also comprises an outlet duct (87) which allows the fluid to flow from the piston chamber (65) to the pressure vessel (35) and an input duct (89) which in combination with the entry groove (91) in the pressure vessel (35) allows fluid to flow from the storage tank (13) to the piston chamber (65). A first flexible valve disk (93) is installed in a knob (95) that is located in the outer lower end (59) of the pump's cylinder (49) allowing the first disk (93) to be placed above the outlet duct's end (87). A second flexible valve disk (97) is installed on the lower end (59) within the piston chamber (65), so that the second disc (97) is placed over the opening of the input duct (89). The second disc (97) is held in place by a screw (99) which is screwed into the lower end (59) of the pump's cylinder (49).

When the piston (51) is in the down stroke, the reduced pressure in the piston chamber (65) draws out the fluid from the storage tank (13) through the input ducts (91 and 89) and the piston chamber (65), but due to the reduced pressure in the piston chamber (65), the first disc (93) blocks the outlet duct (87) and no fluid flows to the piston chamber (65) from the pressure vessel (35).

When the piston (51) is in the upstroke, the increased pressure in the piston chamber (65) will force the fluid from the piston chamber (65) through the outlet duct (87), and into the pressure vessel (35), but due to the increased pressure in the piston chamber (65), the second disc (97) blocks the input duct (89) and no liquid will flow into the storage tank (13) from the piston chamber (65). Hence, the fluid is pumped from the storage tank (13) and is pressurized inside the pressure vessel (35) through the repetitive upward and downward strokes of the reciprocating piston (51).

Figure 3:
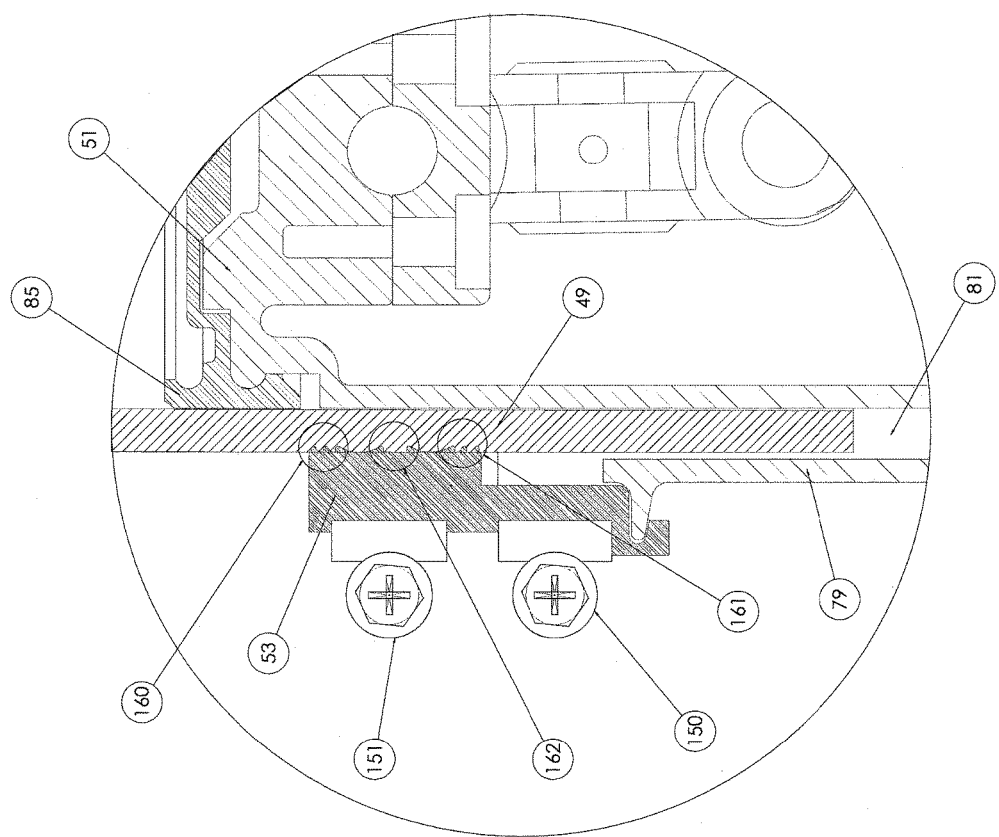
FIG. 3 is a lateral sectional view of the sealing barrier against leakage.

The sealing barrier against leakage that is part of the purr p assembly, illustrated in FIG. 3, comprises a sealing ring (53) preferably made of a suitably flexible and durable material such as rubber that is resistant to weather and chemicals. On its exterior, the ring (53) has a collar (150) that helps to hold it in place as well as a second groove and a compression clamp (151). The ring (53) with various sealing lips in the interior, seals against the cylinder (49) and forms the barrier against leakage. One end of the sealing ring (53) seals the outer wall (79) of the piston (51) and the opposite end remains unattached. If the sealing surface (85) is worn out, fluid will leak out and fall into the lower collection chamber (81) filling it slowly during the upstroke, and once the piston (51) reaches the up position and begins the downward movement, fluid is ejected from the chamber (81) via a connector (152) (FIG. 1), the return hose (55), and the pipes (153 and 154), to the inside of the tank (13).

Moreover, the sealing ring (53) (FIG. 3) in its upper portion, prevents the escape of fluid forcing it to remain in the chamber (81) later allowing it to empty (FIG. 1) into the interior of the tank (13) through the connector hose (152) and the ducts (55, 153, 154).

The sealing ring (53) contains three upper inner lips (160) that serve as cleaners (see FIG. 3) as well as three lower inner lips (161) that serve the same function. The two central lips (162) are actually the ones that seal the sealing ring (53) to the cylinder (49). On its outer surface, this cylinder (49) is completely smooth therefore producing a perfect seal against any leakage between the cylinder (49) and the ring (53) during the upward and downward strokes.

When the inner lips are brand new or have been slightly used, the clamp (151) that is located on the upper outer portion of the sealing ring (53) initially has no function. However, when the inner lips become worn out, it is possible to tighten the clamp to achieve a greater seal and in this way compensate for the mechanical wear. It is to be appreciated that a spring may be used as an alternative to the clamp (151).

As illustrated in FIG. 1, the handle portion of the pump piston assembly performs the reciprocating action of the piston and comprises a horizontal rotating crosspiece (113) integrally attached to the support structure (21) using bearings (115). The crosspiece (113) is connected to a handle (117) which is used by the operator with great mechanical utility to turn the crosspiece (113) and toggle the piston (51). A bell crank (57) is firmly attached to the beam (113) which centers the be crank (57) on the piston (51). The be crank (57) is attached to the center of the piston (51) through a groove (121) in the inner and outer walls (75, 79), which are appropriately connected to maintain the integrity of the primary collection chamber (81) and the cylinder wall (63), as illustrated in FIG. 1. The groove (121) is preferably not longer than the total linear displacement of the piston (51) during the reciprocating movement.

Referring back to FIG. 2, the bell crank (57) is preferably connected to an extension (123) by means of rotation which then connects to the piston (51) by means of rotation. The double pivot connection between the bell crank (57) (FIG. 2), the extension (123), and the piston (51), allows for flexibility, precisely in the place where the crosspiece (113) attaches to the supporting structure (21).

The said flexibility substantially prevents the piston (51) from getting stuck in the piston chamber (65) during the reciprocating movement.

Referring again to FIG. 1, once the fluid is pressurized in the pressure vessel (35), it is evacuated via a pressure outlet (125) in the cylindrical end (37) of the pressure vessel (35). Due to its sealing ability, the pressure outlet (125) is attached to a hose (127) and a regulator valve (129) which is used at the discretion of the operator to drain the pressurized fluid from the pressure vessel (35).

The present invention has been shown and described above with reference to its specific embodiments. It should be noted that the present invention is in no way limited to the details of the illustrated materials, shape and dimensions of the components of this invention, but that changes and modifications can be made by experts in the field within the scope of the appended claims.

What is claimed is:

1. A sprayer device comprising:
   a tank configured to be carried by a human operator;
   a fluid outlet opening in the tank;
   a spray nozzle connected to the outlet opening by one or more conduits;
   a pump assembly having a) a pumping apparatus which comprises a cylinder which has a smooth outer surface and a piston that moves up and down within the cylinder to pump fluid from the outlet opening, through said at least one conduit and out of the spray nozzle and b) a leakage barrier which comprises a sealing ring and a collar, the sealing ring having one end attached to the piston and a plurality of inner lips which contact and ride on the smooth outer surface of the cylinder as the piston and sealing ring move up and down, the collar being operative to apply pressure on the sealing ring to maintain sealing contact between the inner lips and the outer surface of the cylinder;
   said piston having a wall that extends around the cylinder and defines, in part, a leakage fluid collection chamber for collecting fluid that leaks around the piston; and
   at least one fluid return conduit for connecting the leakage fluid collection chamber to the tank;
   wherein the pumping apparatus is additionally operative to pump leakage fluid that enters the leakage fluid collection chamber through said at least one return conduit and back into the tank.

2. A device according to claim 1 wherein:
   the piston reciprocates between an upstroke and a downstroke;
   on the upstroke the piston pumps fluid through said at least one conduit and out of the spray nozzle; and
   on the downstroke, the piston pumps any leakage fluid from the leakage fluid collection area through said at least one return conduit and back into the tank.

3. A device according to claim 2 further comprising a pressure vessel in which the fluid accumulates before exiting the spray nozzle and wherein, on the upstroke, the piston pumps fluid from the outlet opening, through said at least one conduit into the pressure vessel such that fluid accumulates in the pressure vessel and subsequently sprays out of the spray nozzle.

4. A device according to claim 1 further comprising a pressure vessel in which the fluid accumulates before exiting the spray nozzle.

5. A device according to claim 1 wherein the sealing ring has first, second and third inner lips.

6. A device according to claim 1 wherein said at least one fluid return conduit comprises a hose that is connected through an internal duct in the collection chamber without requiring drilling or forming a hole in the tank.

7. A device according to claim 1 wherein the pump is manually operated.

8. A device according to claim 1 wherein the tank is adapted to be carried on the back of a human operator.

* * * * *